(12) United States Patent
Freidrich et al.

(10) Patent No.: US 8,158,699 B2
(45) Date of Patent: Apr. 17, 2012

(54) WATER-SOLUBLE COPOLYMERS CONTAINING SULPHO GROUPS, PROCESS FOR THEIR PREPARATION AND THEIR USE

(75) Inventors: Stefan Freidrich, Garching (DE); Michael Schinabeck, Altenmarkt (DE); Andreas Tselebidis, Anning (DE); Michael Nachreiner, Kienberg (DE)

(73) Assignee: Construction Research & Technology GmbH, Trostberg (DE)

( * ) Notice: Subject to any disclaimer, the term of this patent is extended or adjusted under 35 U.S.C. 154(b) by 373 days.

(21) Appl. No.: 12/087,086

(22) PCT Filed: Feb. 13, 2007

(86) PCT No.: PCT/EP2007/001249
§ 371 (c)(1),
(2), (4) Date: Jun. 25, 2008

(87) PCT Pub. No.: WO2007/093392
PCT Pub. Date: Aug. 23, 2007

(65) Prior Publication Data
US 2009/0036571 A1    Feb. 5, 2009

(30) Foreign Application Priority Data
Feb. 15, 2006    (DE) .................... 10 2006 007 004

(51) Int. Cl.
C04B 28/02    (2006.01)
C08F 12/30    (2006.01)
C08F 20/04    (2006.01)
C08F 220/04    (2006.01)

(52) U.S. Cl. ............ 524/8; 524/817; 526/287; 526/304; 526/312

(58) Field of Classification Search .............. 524/8, 817; 526/287, 304, 312
See application file for complete search history.

(56) References Cited

U.S. PATENT DOCUMENTS

| | | | |
|---|---|---|---|
| 5,476,885 A | 12/1995 | Tahara et al. | |
| 5,684,075 A | 11/1997 | Patel et al. | |
| 5,693,698 A | 12/1997 | Patel et al. | |
| 6,187,887 B1 | 2/2001 | Albrecht et al. | |
| 6,258,162 B1 * | 7/2001 | Kawakami et al. | 106/810 |
| 6,294,015 B1 * | 9/2001 | Yamashita et al. | 106/802 |
| 6,395,853 B1 | 5/2002 | Oswald et al. | |
| 6,545,083 B1 * | 4/2003 | Hirata et al. | 524/556 |
| 6,565,645 B1 | 5/2003 | Klein et al. | |
| 6,864,337 B2 * | 3/2005 | Yuasa et al. | 526/312 |
| 6,869,998 B2 * | 3/2005 | Bair et al. | 524/556 |
| 7,238,760 B2 * | 7/2007 | Schinabeck et al. | 526/288 |
| 7,605,196 B2 * | 10/2009 | Schinabeck et al. | 524/5 |
| 7,772,300 B2 * | 8/2010 | Schinabeck et al. | 524/44 |
| 2004/0024154 A1 * | 2/2004 | Schinabeck et al. | 526/287 |

FOREIGN PATENT DOCUMENTS

| | | |
|---|---|---|
| DE | 199 14 367 | 10/1999 |
| DE | 696 14 287 | 5/2002 |
| DE | 10 2004 013 158 A1 | 10/2005 |
| DE | 10 2005 037 777 A1 | 2/2007 |
| EP | 0 936 228 A1 | 8/1999 |
| EP | 1 059 316 A1 | 12/2000 |
| WO | WO 02/083743 A1 | 10/2002 |
| WO | WO 2007/017286 | 2/2007 |

* cited by examiner

*Primary Examiner* — Tae H Yoon
(74) *Attorney, Agent, or Firm* — Fulbright & Jaworski L.L.P.

(57) ABSTRACT

Water-soluble sulfo group containing copolymers use as stabilizers, rheology modifiers and water retention agents in aqueous building materials based on hydraulic binders, such as cement, lime, gypsum and anhydrite, and in water-based painting and coating systems are described. Processes of preparing the copolymers and methods of using them are also described.

38 Claims, No Drawings

WATER-SOLUBLE COPOLYMERS CONTAINING SULPHO GROUPS, PROCESS FOR THEIR PREPARATION AND THEIR USE

This application is a §371 of PCT/EP2007/001249 filed Feb. 13, 2007, which claims priority from German Patent Application No. 10 2006 007 004.6 filed Feb. 15, 2006.

The present invention relates to sulfo group-containing water-soluble copolymers, processes for their preparation and their use as stabilizers in aqueous building material systems and water-based painting and coating systems.

In the past, highly fluid concretes such as, for example, self compacting concrete (SCC) were developed, which offer a number of advantages for the user. After filling into the formwork, such concretes do not have to be laboriously compacted, since they are so fluid that they fill out the specified mold and even compact themselves. A very dense structure is obtained, which is advantageous for the durability of the concrete. Moreover, with self compacting concrete very smooth surfaces are obtained, which meet the demands on architectural concrete.

In order to achieve the high fluidity of such concretes, superplasticizers, usually based on polycarboxylate ethers, are used. As a result of the high fluidity of such concrete mixtures, however, segregation of the coarse aggregates and the separation of bleed water on the surface would occur. This has adverse effects on the workability and the properties of the hardened building material mixture. This is prevented by a higher content of fines in self compacting concrete than in standard concrete and by the use of stabilizers (also known as antisegregation agents, anti-bleeding agents or viscosity modifying admixtures).

To this end, inter alia water-soluble nonionic derivatives of polysaccharides (cellulose and starch derivatives), but also microbially produced polysaccharides such as, for example, welan gum are used in aqueous building materials.

To an increased extent, however, synthetic polymers are also used as stabilizers in highly fluid concretes, as they show considerable advantages compared to the polysaccharide derivatives (stabilization without impairment of the fluidity, storage stability, no retardation). Such polymers based on 2-acrylamido-2-methylpropanesulfonic acid are described, for example, in WO 2005/035 603 A1 and DE 10 2004 032 304 A1. In fluid building material systems with a high content of fines, such as, for example, self compacting concrete, these copolymers show very good stabilization (prevention of bleeding and segregation).

Likewise, sulfo group-containing copolymers which have a very good stabilizing effect are described in DE 198 06 482 A1 and DE 100 37 629 A1. However, these polymers significantly increase the plastic viscosity of the mixture, such that the fluidity of the building material is reduced to an unacceptable extent for the user. Although by addition of or increase in the dosage of superplasticizer the plastic viscosity can be reduced again, but the additionally resulting costs for the superplasticizer are a considerable economic disadvantage for the user.

Although self compacting concrete with a high content of fines offers many advantages, it also has a considerable disadvantage. Due to the high fines content (especially cement), the raw material costs for the user are markedly higher than in the case of a standard concrete. Efforts are therefore made to significantly reduce the fines content, especially the cement, to achieve a reduction of the costs. At the same time, the advantageous properties of a self compacting concrete should be retained.

As a result of the significant reduction of the fines content, the demands on the action of the stabilizer are considerably increased. The lower the fines content of the highly fluid mixture, the higher is the tendency for segregation of the coarse aggregates and bleeding.

Using stabilizers according to the prior art, although a slight reduction of the fines content can be compensated, the stabilizing action is not sufficient, for example, to produce a self compacting concrete with a very low fines content which is highly fluid and nevertheless homogeneous, i.e. shows no segregation and no bleeding.

The present invention was therefore based on the object of making available copolymers for use as stabilizers and rheology modifiers for aqueous building material systems with a very low fines content which do not have said disadvantages of the prior art. The copolymers, as stabilizers for aqueous fluid building material systems which only possess a very low content of fines, should have an outstanding stabilizing effect and simultaneously not increase the viscosity of the system too much, such that the workability is not adversely influenced or in the case of pumped building material mixtures the pump pressure is not significantly increased.

Moreover, the additives should impart to the building material systems excellent properties during application and in the hardened or dried state.

This object was achieved according to the invention by the copolymers according to claim 1.

It has in fact surprisingly been shown that by means of the copolymers according to the invention a considerable improvement of the stabilization is achieved in aqueous building materials with a very low fines content based on hydraulic binders such as cement, lime, gypsum, anhydrite etc.

The water-soluble sulfo group-containing copolymers according to the present invention consist of at least three structural groups a), b), c) and/or d).

The first structural group is a sulfo group-containing substituted acrylic or methacrylic derivative of the formula (I):

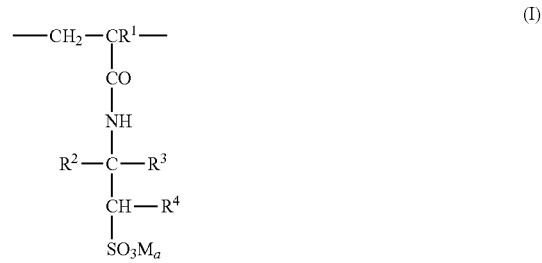

where
$R^1$=hydrogen or methyl,
$R^2$, $R^3$, $R^4$=hydrogen, an aliphatic hydrocarbon radical having 1 to 6 C atoms, a phenyl radical optionally substituted by methyl groups and
M=hydrogen, a mono- or divalent metal cation, ammonium or an organic amine radical, and
a=½ or 1.

The mono- or divalent metal cation used is preferably sodium, potassium, calcium or magnesium ions. Organic amine radicals employed are preferably substituted ammonium groups which are derived from primary, secondary or tertiary $C_1$- to $C_{20}$-alkylamines, $C_1$- to $C_{20}$-alkanolamines, $C_5$- to $C_8$-cycloalkylamines and $C_6$- to $C_{14}$-arylamines.

Examples of appropriate amines are methylamine, dimethylamine, trimethylamine, ethanolamine, diethanolamine, triethanolamine, cyclohexylamine, dicyclohexylamine, phenylamine and diphenylamine in the protonated ammonium form.

Structural group a) is derived from monomers such as 2-acrylamido-2-methylpropanesulfonic acid, 2-methacrylamido-2-methylpropanesulfonic acid, 2-acrylamidobutanesulfonic acid, 3-acrylamido-3-methylbutanesulfonic acid, 2-acrylamido-2,4,4-trimethylpentanesulfonic acid. 2-Acrylamido-2-methylpropanesulfonic acid is particularly preferred.

Optionally, up to 30% of structural group a) can be replaced by further sulfonic acid group-containing structural units which are derived from methallylsulfonic acid or allylsulfonic acid monomers.

The second structural group b) corresponds to the formula (II)

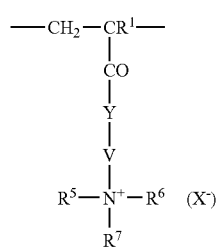

in which
Y=O, NH or $NR^5$,
V=—$(CH_2)_x$—,

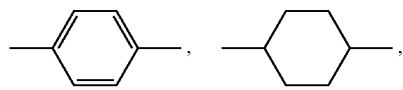

$R^5$ and $R^6$ independently of one another are an aliphatic hydrocarbon radical having 1 to 20 C atoms, a cycloaliphatic hydrocarbon radical having 5 to 8 C atoms or an aryl radical having 6 to 14 C atoms. These radicals can optionally be substituted by hydroxyl, carboxyl or sulfonic acid groups.
$R^7=R^5$ or $R^6$, —$(CH_2)_x$—$SO_3M_a$,

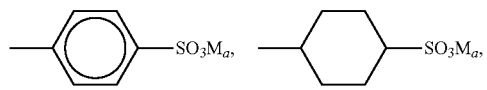

x=1 to 6,
x=halogen (preferably Cl, Br), $C_1$- to $C_4$-alkylsulfate (preferably methylsulfate) or $C_1$- to $C_4$-alkylsulfonate and
$R^1$, M and a have the abovementioned meaning.

Possible monomers which form structure (II) are preferably the following monomers: [2-(acryloyloxy)ethyl]trimethylammonium chloride, [2-(acryloylamino)ethyl]trimethylammonium chloride, [2-(acryloyloxy)ethyl]trimethylammonium methosulfate, [2-(methacryloyloxy)ethyl]trimethylammonium chloride or methosulfate, [3-(methacryloylamino)propyl]trimethylammonium chloride, N-(3-sulfopropyl)-N-methacryloxyethyl-N'—N-dimethylammonium betaine, N-(3-sulfopropyl)-N-methyacrylamidopropyl-N,N-dimethylammonium betaine and 1-(3-sulfopropyl)-2-vinylpyridinium betaine.

Optionally, up to 5 mol % of the structural groups b) can be replaced by further cationic structural units which are derived from N,N-dimethyldiallylammonium chloride and N,N-diethyldiallylammonium chloride.

The third structural group c) corresponds to the formula (III)

where
$Z$=—$(CH_2)_q$—$O(C_nH_{2n}O)_p$—$R^8$, —$COO(C_nH_{2n}O)_p$—$R^8$
n=2 to 4
p=1 to 200
q=0 to 20
$R^8$=H, $C_1$- to $C_4$-alkyl, and
$R^1$ has the abovementioned meaning.

Preferred monomers which form structure (III) are allylpolyethylene glycol (350 to 2000), methylpolyethylene glycol (350 to 3000) monovinyl ether, polyethylene glycol (500 to 5000) vinyloxybutyl ether, polyethylene glycol-block-propylene glycol (500 to 5000) vinyloxybutyl ether, methylpolyethylene glycol-block-propylene glycol allyl ether, methylpolyethylene glycol 750 methacrylate, polyethylene glycol 500 methacrylate, methylpolyethylene glycol 2000 monovinyl ether, methylpolyethylene glycol-block-propylene glycol allyl ether etc.

The fourth structural group d) corresponds to the formula (IV)

in which
$U$=—$COO(C_nH_{2n}O)_p$—$R^9$, —$(CH_2)_q$—$O(C_nH_{2n}O)_p$—$R^9$
$R^9$=

or an unsaturated or saturated, linear or branched aliphatic alkyl radical having 10 to 30 C atoms,
$R^{10}$=H, $C_1$- to $C_6$-alkyl-, or an arylalkyl group having a $C_1$- to $C_{12}$-alkyl or $C_6$- to $C_{14}$-aryl radical,
y=1 to 3, and
$R^1$, n, p and q have the abovementioned meaning.

Preferred monomers which form structure (IV) are tristyrylphenol polyethylene glycol 1100 methacrylate, behenylpolyethylene glycol 1100 methacrylate, stearylpolyethylene glycol 1100 methacrylate, laurylpolyethylene glycol 350 methacrylate, tristyrylphenol polyethylene glycol 1100 acrylate, tristyrylphenol polyethylene glycol 1100 monovinyl ether, behenylpolyethylene glycol 1100 monovinyl ether, stearylpolyethylene glycol 1100 monovinyl ether, laurylpolyethylene glycol monovinyl ether, tristyrylphenol polyethylene glycol 1100 vinyloxybutyl ether, behenylpolyethylene glycol 1100 vinyloxybutyl ether, laurylpolyethylene glycol monoallyl ether, tristyrylphenol polyethylene glycol-block-propylene glycol allyl ether, behenylpolyethylene glycol-block-propylene glycol allyl ether, stearylpolyethylene glycol-block-propylene glycol allyl ether etc.

It is to be regarded as essential to the invention that the copolymers consist of 40 to 93.89 mol % of structural group a), 6 to 59.89 mol % of structural group b), 0.1 to 10 mol % of structural group c) and/or 0.01 to 0.5 mol % of structural group d), such that a total of 100 mol % results. Preferably, copolymers used contain 50 to 89.67 mol % of a), 10 to 45 mol % of b), 0.3 to 5 mol % of c) and/or 0.03 to 0.4 mol % of d), such that a total of 100 mol % results.

It is possible within the scope of the present invention that the copolymers according to the invention additionally contain up to 20 mol %, in particular up to 15 mol %, based on the sums of the structural groups a), b), c) and/or d), of a further structural group e) of the formula (V),

in which
W=—CO—O—(CH$_2$)$_m$—, —CO—NR$^2$—(CH$_2$)$_m$—
m=1 to 6 and
R$^1$, R$^2$, R$^5$ and R$^6$ have the abovementioned meaning.

Possible monomers which form structure (V) are preferably the following compounds: [3-(methacryloylamino)propyl]dimethylamine, [3-(acryloylamino)propyl]dimethylamine, [2-(methacryloyloxy)ethyl]dimethylamine, [2-(acryloyloxy)ethyl]dimethylamine, [2-(methacryloyloxy)ethyl]diethylamine, [2-(acryloyloxy)ethyl]diethylamine etc.

It is furthermore additionally possible within the scope of the present invention that in the copolymers according to the invention up to 30% of structural group a) are replaced by a monomer f) of the formula (VI).

in which R$^1$, M and a have the abovementioned meaning.

Possible monomers which form structure (VI) are preferably the following compounds: acrylic acid, sodium acrylate, methacrylic acid, sodium methacrylate etc.

Optionally, the copolymers can additionally contain, as a result of the incorporation of small amounts of crosslinker, a lightly branched or crosslinked structure. Examples of such crosslinker components are triallylamine, triallylmethylammonium chloride, tetraallylammonium chloride, N,N'-methylenebisacrylamide, triethylene glycol bismethacrylate, triethylene glycol bisacrylate, polyethylene glycol(400) bismethacrylate and polyethylene glycol(400) bisacrylate. These compounds must only be used in amounts such that water-soluble copolymers are still obtained. Generally, the concentration will rarely be above 0.1 mol % based on the sums of structural groups a), b), c), d) and optionally e) and f), but a person skilled in the art can easily determine the maximum applicable amount of the crosslinker component.

The preparation of the copolymers according to the invention is carried out in a manner known per se by linkage of the monomers forming the structures a) to f) by free-radical, ionic or complex coordinative bulk, solution, gel, emulsion, dispersion or suspension polymerization. Since the products according to the invention are water-soluble copolymers, polymerization in aqueous phase, polymerization in inverse emulsion or polymerization in inverse suspension is preferred. In particularly preferred embodiments, the reaction is carried out as a gel polymerization or solution polymerization in aqueous phase.

Auxilliaries, such as chain transfer agents, e.g. thioglycolic acid, mercaptoethanol, formic acid and sodium hypophosphite can likewise be used.

Suitable initiators for the free radical solution polymerization are, for example, sodium, potassium or ammonium peroxodisulfate, 2,2'-azobis(2-amidinopropane) dihydrochloride and other customary radical starters. The concentration of the radical initiators is preferably adjusted to 0.01 g to 10 g per 100 g of monomers.

The polymerization of the monomers is carried out at a temperature between 10 and 100° C. over a preferred period of between 20 min and 24 h, the concentration of the aqueous solution preferably being adjusted to 5 to 30% by weight.

In the case of the likewise preferred gel polymerization, it is advantageous if polymerization is carried out at low reaction temperatures and using a suitable initiator system. By means of the combination of two initiator systems (photoinitiators and redox system), which are first started photochemically at low temperatures and subsequently thermally on account of the exothermicity of the polymerization, a conversion of ≧99% can be achieved.

The workup of the gel block is facilitated by the use of a release agent (e.g. Sitren 595 from Goldschmidt), which prevents the agglutination of the gel granules. The pourable gel particles can thereby be dispersed more readily on a drying grid. Thus the drying process is simplified and the drying times can even be reduced.

The gel polymerization is preferably carried out at −5 to 50° C., the concentration of the aqueous monomer solution preferably being adjusted to 30 to 65% by weight. To carry out the polymerization, according to a preferred embodiment the sulfo group-containing (meth)acrylic derivative in the form of its commercially customary acid form is dissolved in water, neutralized by addition of an alkali metal hydroxide, mixed with stirring with further monomers to be used according to the invention and also with buffers, chain transfer agents and other polymerization auxiliaries. After adjustment of the polymerization pH, which is preferably between 4 and 9, flushing of the mixture with a protective gas such as helium or nitrogen and subsequently heating or cooling to the corresponding polymerization temperature takes place.

If unstirred gel polymerization is chosen as an embodiment, polymerization is carried out in preferred layer thicknesses of 2 to 20 cm, in particular 8 to 10 cm. The polymerization is started by addition of the polymerization initiator and by irradiation with UV light at low temperatures (between −5 and 10° C.). After complete conversion of the monomers the polymer is ground using a release agent (e.g. Sitren 595 from Goldschmidt) in order to accelerate drying by means of a greater surface area.

By means of the most gentle as possible reaction and drying conditions, crosslinking side reactions can be avoided, so that polymers are obtained which have a very low gel content.

The number of repeating structural elements in the copolymers according to the invention is not restricted and depends very strongly on the particular area of use. However, it has proven advantageous to adjust the number of structural units so that the copolymers have a number average molecular weight of 50000 to 10000000. The copolymers are outstandingly suitable as additives for aqueous building material systems which contain hydraulic binders such as cement, lime, gypsum, anhydrite etc. Moreover, they can be applied in water-based painting and coating systems.

The copolymers according to the invention possess excellent stabilizing properties in highly fluid building material systems with very low content of fines even at low dosage and prevent segregation and bleeding. They impart outstanding application technology properties to self compacting concrete with very low content of fines, inter alia, both during processing and in the hardened or dried state. However, even in aqueous building material systems with higher fines content the copolymers according to the invention likewise show excellent stabilizing properties at low doses and prevent bleeding. They impart outstanding application technology properties to self leveling underlayments, grouts and repair mortars, self-leveling screeds, flowable concrete, self compacting concrete, underwater concrete, underwater mortar, pigment-containing paints, inter alia, both during processing and in the hardened or dried state.

By the addition of the copolymers, the viscosity (plastic viscosity) of the building material mixture is not significantly increased and the yield point remains almost unchanged. The workability of the fluid building material is thus not impaired. Moreover, the aqueous solutions of the copolymers according to the invention have very good storage stability.

The copolymers according to the invention can also be used in combination with nonionic polysaccharide derivatives such as methyl cellulose (MC), hydroxyethyl cellulose (HEC), hydroxypropyl cellulose (HPC), methylhydroxyethyl cellulose (MHEC), methylhydroxypropyl cellulose (MHPC) and welan gum or diutan gum.

The preferred dosages of the copolymers according to the invention are, depending on the type of use, between 0.005 and 3 w.-% based on the dry weight of the building material, painting or coating system.

The copolymers according to the invention are used as concrete admixtures as aqueous solutions according to the invention. The copolymers prepared by solution polymerization are used as aqueous solutions. If the copolymers according to the invention, however, are prepared by gel polymerization, solutions must initially be prepared therefrom. For this, the coarser granules having an average particle diameter of between 300 µm and 800 µm are particularly suitable, the fraction of particles having a particle diameter of less than 100 µm being lower than 2 w.-%. The same applies if the copolymers according to the invention are dissolved in other concrete admixtures or formulations of concrete admixtures (e.g. in a flow agent).

For dry mortar applications (e.g. cement or gypsum based self-leveling screeds), the copolymers are used according to the invention as powders. To this end, the polymers are dried and finely ground. Here, the size distribution of the particles is to be chosen by adjustment of the grinding parameters so that the mean particle diameter is less than 100 µm and the fraction of particles having a particle diameter of greater than 200 µm is less than 2 w.-%. Those powders are preferred whose mean particle diameter is less than 60 µm and the fraction of particles having a particle diameter of greater than 120 µm is less 2 w.-%. Those powders are particularly preferred whose mean particle diameter is less than 50 µm and the fraction of particles having a particle diameter of greater than 100 µm is less than 2 w.-%.

The following examples illustrate the invention in more detail.

EXAMPLES

Copolymer 1

Solution Polymerization

A 2 l reaction flask having a jacked coil condenser, mechanical stirrer, thermometer and gas feed tube was filled with 684 ml of water and flushed with nitrogen for one hour. 9.2 g of sodium hydroxide pellets were dissolved with stirring and 47.6 g (0.23 mol, 83.95 mol %) of 2-acrylamido-2-methylpropane-sulfonic acid (I) were added slowly and the mixture was stirred until a clear solution was obtained. Subsequently, 17.2 g (0.04 mol, 15.0 mol %) of [3-(methacrylamido)propyl]trimethylammonium chloride (50 w.-% solution in water) (II) and 0.39 g (0.14 mmol, 0.05 mol %) of tristyrylphenol polyethylene glycol 1100 methacrylate (60 w.-% solution in water) (IV) were dissolved therein. 5 w.-% aqueous sodium hydroxide solution were added with stirring and cooling and a pH of 7 was set. Subsequently, 13.6 g (2.74 mmol, 1.0 mol %) of polyethylene glycol (3000) vinyloxybutyl ether (60 w.-% solution in water) (III) were added and the mixture was heated to 80° C. The reaction was started by addition of 0.5 g of 2,2'-azobis(N,N'-dimethyleneisobutyramide) dihydrochloride. After four hours, the reaction batch was cooled to room temperature.

The solution of copolymer 1 obtained has a solids content of 10% by weight.

Copolymer 2

Gel Polymerization 580 g of water were introduced into a 2 l three-necked flask having a stirrer and thermometer. 87 g of sodium hydroxide pellets were dissolved with stirring and 450 g (2.17 mol, 81 mol %) of 2-acrylamido-2-methylpropanesulfonic acid (I) were added slowly and the mixture was stirred until a clear solution was obtained. After addition of 0.50 g of citric acid hydrate, 5 w.-% aqueous sodium hydroxide solution was added with stirring and cooling and a pH of 7 was set. Subsequently, 155 g (0.45 mol, 17 mol %) of [3-(acryloylamino)propyl]trimethylammonium chloride (60 w.-% solution in water) (II) and 55 g (0.05 mol, 2 mol %) of methylpolyethylene glycol 1100 monovinyl ether (III) were added in succession. 50 ppm of formic acid were added as chain transfer agent. The solution was adjusted to pH=7 using 20 w.-% sodium hydroxide solution, inertized by flushing for 30 minutes with nitrogen and cooled to about 5° C. The solution was transferred to a plastic container having the dimensions (b×d×h) 15 cm×10 cm×20 cm and subsequently 150 mg of 2,2'-azobis(2-amidinopropane) dihydrochloride, 1.0 g of 1 w.-% Rongalit C solution and 10 g of 0.1 w.-% tert-butyl hydroperoxide solution were added in succession. The polymerization was started by irradiation with UV light (two Philips tubes; Cleo Performance 40 W). After about 2-3 h, the hard gel was taken from the plastic container and cut into gel cubes about 5 cm×5 cm×5 cm in size. Before the gel cubes were ground with a conventional meat grinder, they were treated with the release agent Sitren 595 (polydimethylsiloxane emulsion; Goldschmidt). The release agent is a polydimethylsiloxane emulsion, which was diluted 1:20 with water.

The gel granules of copolymer 2 obtained were dispersed uniformly on a drying grid and dried to constant weight in vacuo in a recirculating air drying oven at about 90-120° C.

About 625 g of white, hard granules were obtained, which were ground with a centrifugal mill. The mean particle diameter of the polymer powder of copolymer 2 was 40 µm and less than 1 w.-% of the particles were greater than 100 µm.

Copolymer 3

Corresponding to copolymer 1, copolymer 3 was prepared from 83.1 mol % of 2-acrylamido-2-methylpropanesulfonic acid (I), 15.2 mol % of [3-(acryloylamino)propyl]trimethylammonium chloride (II), 1.5 mol % of polyethylene glycol-block-propylene glycol (1100) vinyloxybutyl ether and 0.2 mol % of laurylpolyethylene glycol 1100 methacrylate (IV). 50 ppm of formic acid were added as chain transfer agent.

Copolymer 4

Corresponding to copolymer 1, copolymer 4 was prepared from 60 mol % of 2-acrylamido-2-methylpropanesulfonic acid (I), 23 mol % of [3-(methacrylamido)propyl]trimethylammonium chloride (II), 2 mol % of methylpolyethylene glycol 750 methacrylate (III) and 15 mol % of N,N-[3-(acryloylamino)propyl]dimethylamine (V).

Copolymer 5

Corresponding to copolymer 2, copolymer 5 was prepared from 50 mol % of 2-acrylamido-2-methylpropanesulfonic acid (I), 38.45 mol % of [3-(methacrylamido)propyl]trimethylammonium chloride (II), 1.5 mol % of polyethylene glycol (1100) vinyloxybutyl ether (III), 0.05 mol % of tristyrylphenolpolyethylene glycol 1100 methacrylate and 10 mol % of acrylic acid (VI). 350 ppm of formic acid were added as chain transfer agent.

Copolymer 6

Corresponding to copolymer 1, copolymer 6 was prepared from 60 mol % of 2-acrylamido-2-methylpropanesulfonic acid (I), 25 mol % of [3-(acryloylamino)propyl]trimethylammonium chloride (II), 1 mol % of polyethylene glycol-block-propylene glycol (1100) vinyloxybutyl ether, 0.05 mol % of tristyrylphenolpolyethylene glycol 1100 methacrylate (IV) and 13.95 mol % of N,N-[3-(acryloylamino)propyl]dimethylamine (V). 20 ppm of formic acid were added as chain transfer agent.

Copolymer 7

Corresponding to copolymer 1, copolymer 7 was prepared from 60.5 mol % of 2-acrylamido-2-methylpropanesulfonic acid (I), 24 mol % of [3-(acryloylamino)propyl]trimethylammonium chloride (II), 0.5 mol % of polyethylene glycol-block-propylene glycol (1100) vinyloxybutyl ether, 10 mol % of N,N-[3-(acryloylamino)propyl]dimethylamine (V) and 5 mol % of acrylic acid (VI).

Copolymer 8

Corresponding to copolymer 1, copolymer 8 was prepared from 90 mol % of 2-acrylamido-2-methylpropanesulfonic acid (I), 9.95 mol % of [3-(acryloylamino)propyl]trimethylammonium chloride (II), and 0.05 mol % of tristyrylphenolpolyethylene glycol 1100 methacrylate (IV). 70 ppm of formic acid were added as chain transfer agent.

Copolymer 9

Corresponding to copolymer 1, copolymer 9 was prepared from 69.93 mol % of 2-acrylamido-2-methylpropanesulfonic acid (I), 15 mol % of [3-(acryloylamino)propyl]trimethylammonium chloride (II), 0.07 mol %, of tristyrylphenolpolyethylene glycol 1100 methacrylate (IV) and 15 mol % of acrylic acid (VI). 80 ppm of formic acid were added as chain transfer agent.

Comparative Example 1

According to WO 2005/035 603 A1, comparative example 1 was prepared from 55 mol % of 2-acrylamido-2-methylpropanesulfonic acid and 45 mol % of [2-(acryloylamino)propyl]trimethylammonium chloride.

Comparative Example 2

According to DE 10 2004 032 304.6, comparative example 2 was prepared from 47.5 mol % of 2-acrylamido-2-methylpropanesulfonic acid, 41.3 mol % of acrylamide, 2.5 mol % of polyethylene glycol-block-propylene glycol (790) vinyloxybutyl ether and 8.7 mol % of [3-(acryloylamino)propyl]dimethylamine. 800 ppm of formic acid were added as chain transfer agent.

Comparative Example 3

According to WO 02/10229 A1, comparative example 3 was prepared from 69.0 mol % of 2-acrylamido-2-methylpropanesulfonic acid, 26.4 mol % of N,N-dimethylacrylamide, 3.8 mol % of [2-(methacryloylamido)propyl]trimethylammonium chloride and 0.8 mol % of tristyrylphenolpolyethylene glycol 1100 methacrylate.

The grinding properties and the drying times necessary for the copolymers which were prepared by gel polymerization are indicated in Table 1. The residual moisture of the ground powder is a measure of the completeness of the drying process.

TABLE 1

| | Gel properties | Drying Temperature [° C.] | Drying Time [min] | Residual moisture [w.-%] |
|---|---|---|---|---|
| Copolymer 2 | very hard, small, readily pourable particles | 90 | 100 | 4 |
| Copolymer 5 | very hard, small, readily pourable particles | 100 | 110 | 5 |
| Comparative example 1 | very hard, small, readily pourable particles | 120 | 75 | 4 |
| Comparative example 2 | very hard, small, readily pourable particles | 100 | 100 | 3 |
| Comparative example 3 | hard, small, readily pourable particles | 100 | 100 | 4 |

Solution viscosities of aqueous solutions are indicated in Table 2.

TABLE 2

| | Viscosity 1 w.-% soln [mPa * s][1] |
|---|---|
| Copolymer 1 | 423 |
| Copolymer 2 | 930 |
| Copolymer 3 | 651 |
| Copolymer 4 | 128 |
| Copolymer 5 | 1715 |
| Copolymer 6 | 382 |
| Copolymer 7 | 84 |
| Copolymer 8 | 276 |
| Copolymer 9 | 181 |
| Comparative example 1 | 563 |
| Comparative example 2 | 4530 |
| Comparative example 3 | 3190 |

[1] 20° C., Brookfield, in $H_2O$ (measured at 5 revolutions per minute)

Use Examples

The application technology assessment of the copolymers according to the invention was carried out with test mixtures from the field of self compacting concretes with very low fines content, self-leveling screeds and machinery grouts.

The concretes were mixed in the laboratory using a 50 liter mechanical mixer. The efficiency of the mixer was 45%.

In the mixing process of the self compacting concretes, aggregates and fines were homogenized in the mixer for 10 seconds before the mixing water, the superplasticizer and the stabilizer (as an aqueous solution or as a powder) were added. The mixing time was 4 minutes. Subsequently, the fresh concrete tests (slump flow measurement, air pore content) were carried out and assessed. The consistency was observed over 120 minutes.

For tests with self compacting concrete, the following test equipment was used:

For the determination of the fluidity, an "Abrams cone" slump cone (upper internal diameter 100 mm, lower internal diameter 200 mm, height 300 mm) was used (slump flow measurement=diameter of the concrete cake in cm measured and averaged by means of two axes standing perpendicular to one another).

The determination of the slump flow was carried out five times per mixture, namely at the times t=0, 30, 60, 90 and 120 minutes after the end of mixing, the mixture being thoroughly mixed again for 60 seconds using the concrete mixer before the respective flow measurement.

For the determination of the air pore content, an air content tester (contents 8 liters) was used, as is described in DIN 1048 (T1).

The bleeding (separation of water on the surface of the still unhardened building material) and the segregation of the mixtures was assessed visually.

The cementitious mortar and anhydrite self-leveling screeds were mixed in the laboratory using a mortar mixer according to DIN EN 196-1. The mixing process was also carried out as described in DIN EN 196-1. The mixing time was 4 min.

The mortar flows (=diameter of the spread cake in cm) was determined using a Vicat ring described in DIN EN 196 part 3 (upper internal diameter=70 mm, lower internal diameter=80 mm, height=40 mm) on a flat, dry glass plate (before the flow measurement, the mixture was stirred again with a spoon for 60 seconds).

Kelco-Crete (welan gum) from CP Kelco and the cellulose ethers Tylose H 20 P2 and Tylose MH 2000 YP2 (products of SE Tylose GmbH & Co. KG, Wiesbaden), were used as further comparison substances to the copolymers according to the invention.

Example B1

Self Compacting Concrete with Low Fine Content

TABLE 3

Mix design
Fines content 400 kg/m³ (cement + ground limestone)

| | Without (comparison) | Welan gum (comparison) | Comparative example 1 | Comparative example 2 | Comparative example 3 |
|---|---|---|---|---|---|
| CEM I 42.5 R | 350 kg/m³ | 350 kg/m³ | 350 kg/m³ | 350 kg/m³ | 350 kg/m³ |
| Sand (0-4 mm) | 857 kg/m³ | 857 kg/m³ | 857 kg/m³ | 857 kg/m³ | 857 kg/m³ |
| Gravel (4-8 mm) | 311 kg/m³ | 311 kg/m³ | 311 kg/m³ | 311 kg/m³ | 311 kg/m³ |
| Gravel (8-16 mm) | 569 kg/m³ | 569 kg/m³ | 569 kg/m³ | 569 kg/m³ | 569 kg/m³ |
| Ground limestone | 50 kg/m³ | 50 kg/m³ | 50 kg/m³ | 50 kg/m³ | 50 kg/m³ |
| Melflux 2453 L[1] | 4.2 kg/m³ | 4.2 kg/m³ | 4.2 kg/m³ | 4.2 kg/m³ | 4.2 kg/m³ |
| Stabilizer | — | 185 g/m³ | 175 g/m³ [2] | 175 g/m³ [2] | 175 g/m³ [2] |
| Water | 200 kg/m³ | 200 kg/m³ | 200 kg/m³ | 200 kg/m³ | 200 kg/m³ |

| | Copolymer 1 | Copolymer 2 | Copolymer 3 | Copolymer 5 | Copolymer 6 |
|---|---|---|---|---|---|
| CEM I 42.5 R | 350 kg/m³ | 350 kg/m³ | 350 kg/m³ | 350 kg/m³ | 350 kg/m³ |
| Sand (0-4 mm) | 857 kg/m³ | 857 kg/m³ | 857 kg/m³ | 857 kg/m³ | 857 kg/m³ |
| Gravel (4-8 mm) | 311 kg/m³ | 311 kg/m³ | 311 kg/m³ | 311 kg/m³ | 311 kg/m³ |
| Gravel (8-16 mm) | 569 kg/m³ | 569 kg/m³ | 569 kg/m³ | 569 kg/m³ | 569 kg/m³ |
| Ground limestone | 50 kg/m³ | 50 kg/m³ | 50 kg/m³ | 50 kg/m³ | 50 kg/m³ |
| Melflux 2453 L[1] | 4.2 kg/m³ | 4.2 kg/m³ | 4.2 kg/m³ | 4.2 kg/m³ | 4.2 kg/m³ |
| Stabilizer | 175 g/m³ [2] | 175 g/m³ [2] | 175 g/m³ [2] | 175 g/m³ [2] | 175 g/m³ [2] |
| Water | 200 kg/m³ | 200 kg/m³ | 200 kg/m³ | 200 kg/m³ | 200 kg/m³ |

[1] product of BASF Construction Polymers GmbH, Trostberg

[2] addition as a 1 w.-% aqueous solution of the respective copolymer (the water content of the stabilizer is subtracted from the total mixing water).

TABLE 4

Comparison of the concrete properties using conventional stabilizers and the copolymers according to the invention.

|  | Without (comparison) | Welan gum (comparison) | Comparative example 1 | Comparative example 2 | Comparative example 3 |
|---|---|---|---|---|---|
| Bleeding | strong | none | strong | medium | medium |
| Segregation | strong | none | medium | medium | medium |
| Air pore content after 0 min | 1.7% | 1.9% | 2.1% | 2.0% | 2.3% |
| Air pore content after 60 min | 2.3% | 2.7% | 2.2% | 2.1% | 2.3% |
| Air pore content after 120 min | 2.7% | 2.3% | 2.5% | 2.6% | 2.2% |
| Compressive strength after 1 day | 7.0 N/mm$^2$ | 15.2 N/mm$^2$ | 10.1 N/mm$^2$ | 13.5 N/mm$^2$ | 13.9 N/mm$^2$ |
| Compressive strength after 7 days | 23.1 N/mm$^2$ | 31.3 N/mm$^2$ | 26.2 N/mm$^2$ | 28.3 N/mm$^2$ | 29.2 N/mm$^2$ |
| Compressive strength after 14 days | 25.4 N/mm$^2$ | 35.3 N/mm$^2$ | 29.2 N/mm$^2$ | 31.4 N/mm$^2$ | 32.1 N/mm$^2$ |
| Compressive strength after 28 days | 27.2 N/mm$^2$ | 39.1 N/mm$^2$ | 32.5 N/mm$^2$ | 35.6 N/mm$^2$ | 36.5 N/mm$^2$ |

|  | Copolymer 1 | Copolymer 2 | Copolymer 3 | Copolymer 5 | Copolymer 6 |
|---|---|---|---|---|---|
| Bleeding | none | none | none | none | none |
| Segregation | none | none | none | none | none |
| Air pore content after 0 min | 2.1% | 2.0% | 2.2% | 2.1% | 2.2% |
| Air pore content after 60 min | 2.1% | 2.2% | 2.3% | 2.2% | 2.3% |
| Air pore content after 120 min | 2.3% | 2.3% | 2.2% | 2.3% | 2.4% |
| Compressive strength after 1 day | 16.1 N/mm$^2$ | 16.6 N/mm$^2$ | 15.9 N/mm$^2$ | 16.0 N/mm$^2$ | 15.2 N/mm$^2$ |
| Compressive strength after 7 days | 32.5 N/mm$^2$ | 31.4 N/mm$^2$ | 33.1 N/mm$^2$ | 30.9 N/mm$^2$ | 31.2 N/mm$^2$ |
| Compressive strength after 14 days | 36.1 N/mm$^2$ | 35.4 N/mm$^2$ | 36.9 N/mm$^2$ | 35.1 N/mm$^2$ | 37.2 N/mm$^2$ |
| Compressive strength after 28 days | 40.2 N/mm$^2$ | 40.8 N/mm$^2$ | 41.2 N/mm$^2$ | 39.7 N/mm$^2$ | 41.1 N/mm$^2$ |

TABLE 5

Slump flows for the concrete mixes of Example B1 over time.

|  | Slump flow after 0 min [cm] | Slump flow after 30 min [cm] | Slump flow after 60 min [cm] | Slump flow after 90 min [cm] | slump flow after 120 min [cm] |
|---|---|---|---|---|---|
| Welan gum | 67 | 64 | 63 | 60 | 58 |
| Comparative Example 1 | 72 | 70 | 66 | 63 | 61 |
| Comparative Example 2 | 71 | 68 | 65 | 65 | 62 |
| Comparative Example 3 | 69 | 67 | 66 | 63 | 61 |
| Copolymer 1 | 70 | 70 | 69 | 68 | 66 |
| Copolymer 2 | 73 | 71 | 66 | 63 | 62 |
| Copolymer 3 | 72 | 71 | 70 | 69 | 68 |
| Copolymer 5 | 71 | 70 | 68 | 66 | 65 |
| Copolymer 6 | 72 | 70 | 69 | 68 | 65 |

The results show that on addition of the copolymers according to the invention the workability (slump flow measurements over time) of the self compacting concrete with low fines content of 400 kg/m³ improves considerably and at the same time a very stable concrete is obtained, i.e. no separation of bleed water and no segregation occurs.

With the comparative examples 1-3, however, adequate stabilization of the concrete with low fines content is not achieved, i.e. bleeding and segregation occur, which is very disadvantageous for the properties of the hardened concrete. With welan gum, although a very stable concrete is obtained, the workability is significantly reduced by the excessively strong thickening of the welan gum, which is a serious disadvantage for the user.

The flexural strength and compressive strength are not disadvantageously influenced by the copolymers according to the invention.

Example B2

Self Compacting Concrete with a Very Low Fines Content

TABLE 6

Mix design
Fines content 350 kg/m³ (cement + fly ash)

|  | Without (comparison) | Welan gum (comparison) | Comparative example 2 | Comparative example 3 | Copolymer 1 |
|---|---|---|---|---|---|
| CEM I 42.5 R | 300 kg/m³ | 300 kg/m³ | 300 kg/m³ | 300 kg/m³ | 300 kg/m³ |
| Sand (0-4 mm) | 883 kgm³ | 883 kg/m³ | 883 kg/m³ | 883 kg/m³ | 883 kg/m³ |
| Gravel (4-8 mm) | 320 kg/m³ | 320 kg/m³ | 320 kg/m³ | 320 kg/m³ | 320 kg/m³ |
| Gravel (8-16 mm) | 587 kg/m³ | 587 kg/m³ | 587 kg/m³ | 587 kg/m³ | 587 kg/m³ |
| Fly ash | 50 kg/m³ | 50 kg/m³ | 50 kg/m³ | 50 kg/m³ | 50 kg/m³ |
| Melflux 2453 L[1)] | 3.6 kg/m³ | 3.6 kg/m³ | 3.6 kg/m³ | 3.6 kg/m³ | 3.6 kg/m³ |
| Stabilizer | — | 195 g/m³ | 180 g/m³[2)] | 180 g/m³[2)] | 180 g/m³[2)] |
| Water | 195 kg/m³ | 195 kg/m³ | 195 kg/m³ | 195 kg/m³ | 195 kg/m³ |

|  | Copolymer 4 | Copolymer 7 | Copolymer 8 | Copolymer 9 |
|---|---|---|---|---|
| CEM I 42.5 R | 300 kg/m³ | 300 kg/m³ | 300 kg/m³ | 300 kg/m³ |
| Sand (0-4 mm) | 883 kg/m³ | 883 kg/m³ | 883 kg/m³ | 883 kg/m³ |
| Gravel (4-8 mm) | 320 kg/m³ | 320 kg/m³ | 320 kg/m³ | 320 kg/m³ |
| Gravel (8-16 mm) | 587 kg/m³ | 587 kg/m³ | 587 kg/m³ | 587 kg/m³ |
| Fly ash | 50 kg/m³ | 50 kg/m³ | 50 kg/m³ | 50 kg/m³ |
| Melflux 2453 L[1)] | 3.6 kg/m³ | 3.6 kg/m³ | 3.6 kg/m³ | 3.6 kg/m³ |
| Stabilizer | 180 g/m³[2)] | 180 g/m³[2)] | 180 g/m³[2)] | 180 g/m³[2)] |
| Water | 195 kg/m³ | 195 kg/m³ | 195 kg/m³ | 195 kg/m³ |

[1)] product of BASF Construction Polymers GmbH, Trostberg
[2)] addition as a 1 w.-% aqueous solution of the respective copolymer (the water content of the stabilizer is subtracted from the total mixing water).

TABLE 7

Comparison of the concrete properties using conventional stabilizers and the copolymers according to the invention.

|  | Without (comparison) | Welan gum (comparison) | Comparative example 2 | Comparative example 3 | Copolymer 1 | Copolymer 4 | Copolymer 7 | Copolymer 8 | Copolymer 9 |
|---|---|---|---|---|---|---|---|---|---|
| Bleeding | strong | none | medium | medium | none | none | none | none | none |
| Segregation | strong | none | medium-strong | medium | none | none | none | none | none |
| Air pore content after 0 min | 1.8% | 2.0% | 2.0% | 2.0% | 2.1% | 2.1% | 2.0% | 2.2% | 2.3% |
| Air pore content after 60 min | 2.2% | 2.6% | 2.2% | 2.1% | 2.3% | 2.4% | 2.2% | 2.2% | 2.2% |
| Air pore content after 120 min | 2.6% | 2.5% | 2.7% | 2.4% | 2.4% | 2.5% | 2.3% | 2.3% | 2.5% |
| Compressive strength after 1 day | 5.1 N/mm² | 11.0 N/mm² | 7.3 N/mm² | 8.8 N/mm² | 12.4 N/mm² | 12.7 N/mm² | 11.8 N/mm² | 10.9 N/mm² | 12.6 N/mm² |
| Compressive strength after 7 days | 18.2 N/mm² | 25.9 N/mm² | 21.3 N/mm² | 23.4 N/mm² | 26.5 N/mm² | 26.8 N/mm² | 25.5 N/mm² | 26.0 N/mm² | 27.2 N/mm² |
| Compressive strength after 14 days | 20.3 N/mm² | 27.2 N/mm² | 23.4 N/mm² | 25.9 N/mm² | 28.7 N/mm² | 28.1 N/mm² | 27.9 N/mm² | 28.2 N/mm² | 29.5 N/mm² |
| Compressive strength after 28 days | 22.6 N/mm² | 30.8 N/mm² | 26.5 N/mm² | 29.2 N/mm² | 32.9 N/mm² | 33.7 N/mm² | 31.3 N/mm² | 32.1 N/mm² | 33.7 N/mm² |

TABLE 8

Slump flows for the concrete mixes of Example B2 over time.

| | Slump flow after 0 min [cm] | Slump flow after 30 min [cm] | Slump flow after 60 min [cm] | Slump flow after 90 min [cm] | Slump flow after 120 min [cm] |
|---|---|---|---|---|---|
| Welan gum | 66 | 63 | 61 | 60 | 57 |
| Comparative Example 2 | 70 | 69 | 64 | 63 | 61 |
| Comparative Example 3 | 69 | 67 | 65 | 62 | 60 |
| Copolymer 1 | 71 | 70 | 68 | 67 | 66 |
| Copolymer 4 | 70 | 69 | 67 | 64 | 64 |
| Copolymer 7 | 70 | 70 | 68 | 67 | 65 |
| Copolymer 8 | 69 | 69 | 68 | 67 | 66 |
| Copolymer 9 | 71 | 70 | 68 | 67 | 65 |

On addition of the copolymers according to the invention, the workability (slump flow over time) is also markedly improved in the self compacting concrete with very low fines content of example B2. Separation of bleed water and segregation likewise do not occur.

With the comparative examples 1-3, however, adequate stabilization of the concrete with very low fines content (350 kg/m$^3$ fines) is not achieved, i.e. bleeding and segregation occur, which is very disadvantageous for the properties of the hardened concrete. Again with welan gum, although a very stable concrete is obtained, the workability is significantly reduced by the excessively strong thickening of the welan gum, which is a serious disadvantage for the user.

The solid concrete properties (flexural strength and compressive strength) are not disadvantageously influenced by the copolymers according to the invention.

The copolymers according to the invention, however, do not only act outstandingly as stabilizers in building materials with very low fines content, but can also be used outstandingly in building materials with higher fines contents. The following test mixtures from the field of self-leveling screeds and machinery grouts should illustrate this in more detail.

Example B3

Self-Leveling Screed Based on Synthetic Anhydrite

TABLE 9

| | Formulations | | | |
|---|---|---|---|---|
| | without stabilizers (comparison) | Tylose MH 2000 YP2[1] (comparison) | Copolymer 1 | Copolymer 8 |
| Synthetic anhydrite | 350.00 g | 350.00 g | 350.00 g | 350.00 g |
| CEN reference quartz sand (EN 196-1, 0-2 mm) | 402.70 g | 402.40 g | 402.6 g | 402.6 g |
| Quartz Filler | 240.00 g | 240.00 g | 240.00 g | 240.00 g |
| CEM I 42.5 R | 7.00 g | 7.00 g | 7.00 g | 7.00 g |
| Melflux 1641 F[2] | 0.30 g | 0.30 g | 0.30 g | 0.30 g |
| Stabilizer | — | 0.30 g | 0.10 g | 0.10 g |
| Water | 170.00 g | 170.00 g | 170.00 g | 170.00 g |

[1] product of SE Tylose GmbH & Co. KG, Wiesbaden

[2] product of BASF Construction Polymers GmbH, Trostberg

TABLE 10

Comparison of the properties of the self-leveling screed formulations mentioned in Example B3.

| | without stabilizers (comparison) | Tylose MH 2000 YP2[1] (comparison) | Copolymer 1 | Copolymer 8 |
|---|---|---|---|---|
| Bleeding | strong | none | none | none |
| Segregation | strong | none | none | none |

TABLE 11

Flow measurements over time for the formulations mentioned in Example B3.

| | Flow after 0 min [cm] | Flow after 15 min [cm] | Flow after 30 min [cm] | Flow after 45 min [cm] | Flow after 60 min [cm] |
|---|---|---|---|---|---|
| Tylose MH 2000 YP2 | 23.3 | 22.1 | 19.5 | 18.8 | 17.7 |
| Copolymer 1 | 23.0 | 22.3 | 21.8 | 21.3 | 20.3 |
| Copolymer 8 | 22.8 | 22.1 | 21.9 | 21.1 | 20.1 |

As the result in tables 10 and 11 show, on addition of the copolymers according to the invention a very stable self-leveling screed is obtained (no bleeding, no segregation) and the workability compared to the comparative example is significantly improved (smaller decrease in the flow over time). Moreover, the copolymers according to the invention only have to be added in a significantly lower dosage.

Example B4

Machinery Grout

The composition of the casting mortar can be seen from Table 12.

TABLE 12

Composition of the test mixture (w.-%)

| Component | Amount |
|---|---|
| Portland cement[1] | 30.75 |
| CEN reference quartz sand (0-2 mm)[2] | 65.33 |
| EFA filler[3] | 2.31 |
| CSA 20[4] | 1.37 |
| Cement/AI powder (995/5)[5] | 0.08 |
| Melflux 1641 F[6] | 0.15 |
| Stabilizer[7] | 0.01 |

[1]CEM I 52.5 R
[2]according to DIN EN 196-1
[3]product of Bau Mineral, Herten
[4]calcium sulfoaluminate, Produkt of Denka, Japan
[5]mixture of 995 parts by weight of CEM I 52.5 R and 5 parts by weight of aluminum powder (Standard SK I, product of Eckart, Fürth)
[6]product of BASF Construction Polymers GmbH, Trostberg
[7]copolymer according to the invention or comparative example

TABLE 13

Comparison of the mortar properties using the copolymers according to the invention and comparative examples.

Machinery grout dry mixture: 1000 g

Mixing water: 100 g

| Additive | Bleeding | Segregation | Flow after 5 min [cm] | Flow after 30 min [cm] | Flow after 60 min [cm] |
|---|---|---|---|---|---|
| Copolymer 2 | none | none | 28.9 | 27.2 | 26.0 |
| Copolymer 4 | none | none | 28.2 | 26.9 | 25.2 |
| Copolymer 6[1] | none | none | 27.0 | 26.5 | 24.7 |
| Tylose H 20 P2 (comparison)[2] | none | none | 27.3 | 25.4 | 23.2 |

[1]dosage 0.005% by weight
[2]dosage 0.04% by weight

The test results in Table 13 show that the copolymers according to the invention have very good flow of the machinery grout (also over time) and prevent bleeding and segregation effectively. The copolymers according to the invention combine outstandingly as stabilizers with the polycarboxylate ether superplasticizer (Melflux 1641 F) and provide an optimum workability of the machinery grout for the user. Compared to the customary commercial stabilizer (Tylose H 20 P2), even higher flows are obtained over time without bleeding and segregation. Moreover, the copolymers according to the invention only have to be added in a significantly lower dosage.

The invention claimed is:

1. A water-soluble sulfo group-containing copolymer consisting of a) 40 to 93.89 mol % of structural groups of the formula (I)

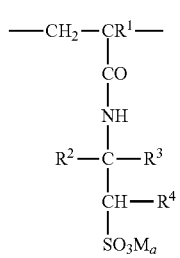

(I)

wherein:

$R^1$ is hydrogen or methyl;

$R^2$, $R^3$, $R^4$ are hydrogen, an aliphatic hydrocarbon radical having 1 to 6 C atoms or a phenyl radical optionally substituted by methyl groups; and M is hydrogen, a mono- or divalent metal cation, ammonium or an organic amine radical; and a is ½ or 1;
b) 6 to 59.89 mol % of structural groups of the formula (II)

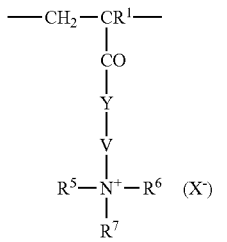

wherein
Y is O, NH or NR$^5$,
V is —(CH$_2$)$_x$—,

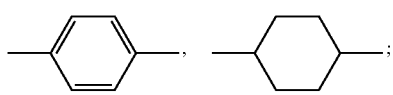

R$^5$ and R$^6$ are independently an aliphatic hydrocarbon radical having 1 to 20 C atoms, a cycloaliphatic hydrocarbon radical having 5 to 8 C atoms or an aryl radical having 6 to 14 C atoms, where the radicals can optionally be substituted by hydroxyl, carboxyl or sulfonic acid groups,
R$^7$ is R$^5$ or R$^6$, —(CH$_2$)$_x$—SO$_3$M$_a$,

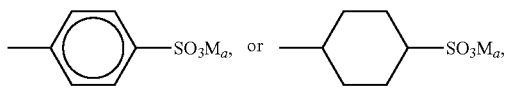

x is from 1 to 6,
X is F, Cl, Br, I, C$_1$- to C$_4$-alkylsulfate or C$_1$- to C$_4$-alkylsulfonate and
R$^1$, M and a are as defined above; and
at least one of c) and d), wherein
c) is from 0.1 to 10 mol % of structural groups of the formula (III)

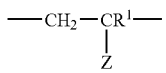

wherein
Z is —(CH$_2$)$_q$—O(C$_n$H$_{2n}$O)$_p$—R$^8$, or —COO(C$_n$H$_{2n}$O)$_p$—R$^8$
n is from 2 to 4;
p is from 1 to 200;
q is from 0 to 20;

R$^8$ is H or a C$_1$- to C$_4$-alkyl radical; and
R$^1$ is as defined above;
and
d) is from 0.01 to 0.5 mol % of structural groups of the formula (IV)

wherein
U is —COO(C$_n$H$_{2n}$O)$_p$—R$^9$, or —(CH$_2$)$_q$—O(C$_n$H$_{2n}$O)$_p$—R$^9$
R$^9$ is

and an unsaturated or saturated, linear or branched aliphatic alkyl radical having 10 to 30 C atoms,
R$^{10}$ is H, a C$_1$- to C$_6$-alkyl or arylalkyl group having a C$_1$- to C$_{12}$-alkyl and C$_6$- to C$_{14}$-aryl radical;
y is 1 to 3; and
R$^1$, n, p and q are as defined above.

2. A copolymer as claimed in claim 1, wherein the mono- or divalent metal cation is selected from the group consisting of sodium, potassium, calcium or magnesium ions.

3. A copolymer as claimed in claim 1, wherein the organic amine radical is a substituted ammonium group derived from a primary, a secondary or a tertiary C$_1$- to C$_{20}$-alkylamine, a C$_1$- to C$_{20}$-alkanolamine, a C$_5$- to C$_8$-cycloalkylamine and a C$_6$- to C$_{14}$-arylamine.

4. A copolymer as claimed in claim 1, wherein at least one of the structural groups a), b) c) and d) are present in amounts of 50 to 89.67 mol % of structural groups a), 10 to 45 mol % of structural groups b), 0.3 to 5 mol % of structural groups c) or 0.03 to 0.4 mol % of structural groups d).

5. A copolymer as claimed in claim 1, wherein the copolymer has a number average molecular weight of 50,000 to 10,000,000 g/mol.

6. A water-soluble sulfo group-containing copolymer consisting of
a) 40 to 93.89 mol % of structural groups of the formula (I)

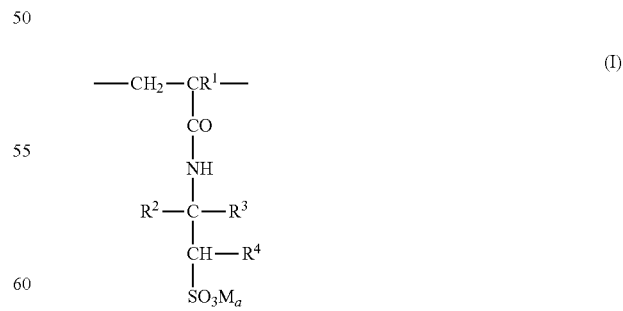

wherein:
R$^1$ is hydrogen or methyl;
R$^2$, R$^3$, R$^4$ are hydrogen, an aliphatic hydrocarbon radical having 1 to 6 C atoms or a phenyl radical optionally substituted by methyl groups; and M is hydrogen, a mono- or divalent metal cation, ammonium or an organic amine radical; and
a is ½ or 1;
b) 6 to 59.89 mol % of structural groups of the formula (II)

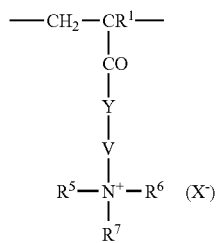
(II)

wherein
Y is O, NH or $NR^5$,
V is $—(CH_2)_x—$,

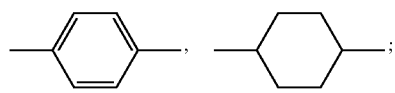

$R^5$ and $R^6$ are independently an aliphatic hydrocarbon radical having 1 to 20 C atoms, a cycloaliphatic hydrocarbon radical having 5 to 8 C atoms or an aryl radical having 6 to 14 C atoms, where the radicals can optionally be substituted by hydroxyl, carboxyl or sulfonic acid groups,
$R^7$ is $R^5$ or $R^6$, $—(CH_2)_x—SO_3M_a$,

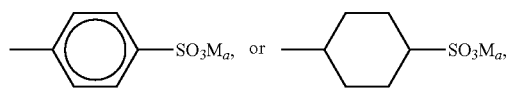

x is from 1 to 6,
X is F, Cl, Br, I, $C_1$- to $C_4$-alkylsulfate or $C_1$- to $C_4$-alkylsulfonate and
$R^1$, M and a are as defined above; and
at least one of c) and d), wherein
c) is from 0.1 to 10 mol % of structural groups of the formula (III)

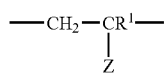
(III)

wherein
Z is $—(CH_2)_q—O(C_nH_{2n}O)_p—R^8$, or $—COO(C_nH_{2n}O)_p—R^8$
n is from 2 to 4;
p is from 1 to 200;
q is from 0 to 20;
$R^8$ is H or a $C_1$- to $C_4$-alkyl radical; and
$R^1$ is as defined above;
and d) is from 0.01 to 0.5 mol % of structural groups of the formula (IV)

(IV)

wherein
U is $—COO(C_nH_{2n}O)_p—R^9$, or $—(CH_2)_q—O(C_nH_{2n}O)_p—R^9$
$R^9$ is

and an unsaturated or saturated, linear or branched aliphatic alkyl radical having 10 to 30 C atoms,
$R^{10}$ is H, a $C_1$- to $C_6$-alkyl or arylalkyl group having a $C_1$- to $C_{12}$-alkyl and $C_6$- to $C_{14}$-aryl radical;
y is 1 to 3; and
$R^1$, n, p and q are as defined above
wherein up to 30 mol % of structural groups a) is replaced by an additional sulfonic acid group-containing structural units which are derived from methallylsulfonic acid or allylsulfonic acid monomers.

7. A water-soluble sulfo group-containing copolymer consisting of
a) 40 to 93.89 mol % of structural groups of the formula (I)

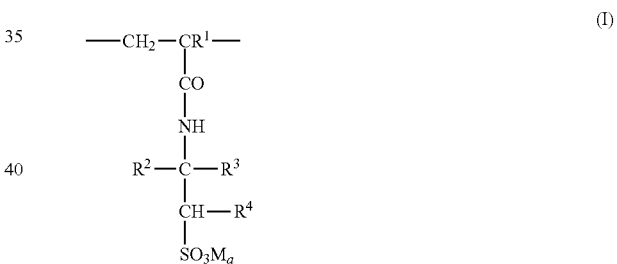
(I)

wherein:
$R^1$ is hydrogen or methyl:
$R^2$, $R^3$, $R^4$ are hydrogen, an aliphatic hydrocarbon radical having 1 to 6 C atoms or a phenyl radical optionally substituted by methyl groups; and
M is hydrogen, a mono- or divalent metal cation, ammonium or an organic amine radical; and
a is ½ or 1;
b) 6 to 59.89 mol % of structural groups of the formula (II)

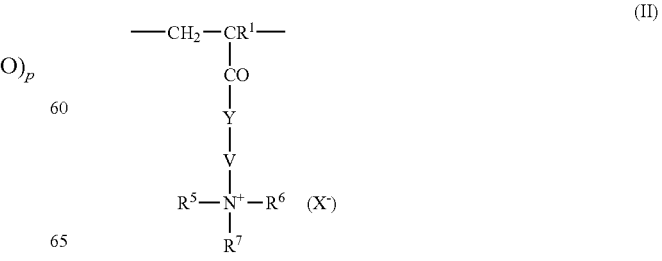
(II)

wherein
Y is O, NH or NR$^5$,
V is —(CH$_2$)$_x$—,

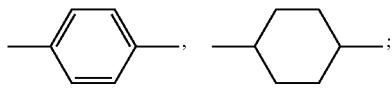

R$^5$ and R$^6$ are independently an aliphatic hydrocarbon radical having 1 to 20 C atoms, a cycloaliphatic hydrocarbon radical having 5 to 8 C atoms or an aryl radical having 6 to 14 C atoms, where the radicals can optionally be substituted by hydroxyl, carboxyl or sulfonic acid groups,
R$^7$ is R$^5$ or R$^6$, —(CH$_2$)$_x$—SO$_3$M$_a$,

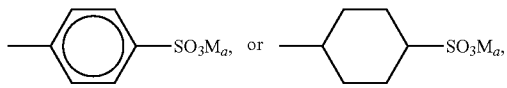

x is from 1 to 6,
X is F, Cl, Br, I, C$_1$- to C$_4$-alkylsulfate or C$_1$- to C$_4$-alkylsulfonate and
R$^1$, M and a are as defined above; and
at least one of c) and d), wherein
c) is from 0.1 to 10 mol % of structural groups of the formula (III)

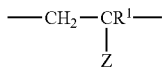

(III)

wherein
Z is —(CH$_2$)$_q$—O(C$_n$H$_{2n}$O)$_p$—R$^8$, or —COO(C$_n$H$_{2n}$O)$_p$—R$^8$
n is from 2 to 4;
p is from 1 to 200;
q is from 0 to 20;
R$^8$ is H or a C$_1$- to C$_4$-alkyl radical; and
R$^1$ is as defined above;
and
d) is from 0.01 to 0.5 mol % of structural groups of the formula (IV)

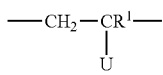

(IV)

wherein
U is —COO(C$_n$H$_{2n}$O)$_p$—R$^9$, or —(CH$_2$)$_q$—O(C$_n$H$_{2n}$O)$_p$—R$^9$
R$^9$ is

and an unsaturated or saturated, linear or branched aliphatic alkyl radical having 10 to 30 C atoms R$^{10}$ is H, a C$_1$- to C$_6$-alkyl or arylalkyl group having a C$_1$- to C$_{12}$-alkyl and C$_6$- to C$_{14}$-aryl radical;
y is 1 to 3; and
R$^1$, n, p and q are as defined above
wherein up to 30 mol % of the structural groups a) are replaced by a monomer f) of the formula (VI)

(VI)

wherein
R$^1$, M and a are as defined above.

8. A water-soluble sulfo group-containing copolymer consisting of
a) 40 to 93.89 mol % of structural groups of the formula (I)

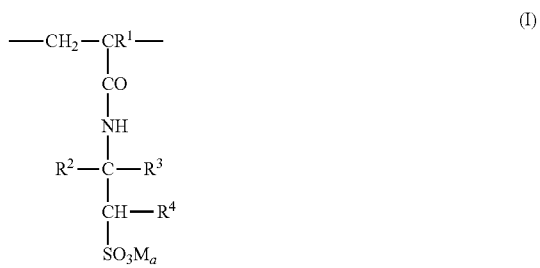

(I)

wherein:
R$^1$ is hydrogen or methyl:
R$^2$, R$^3$, R$^4$ are hydrogen, an aliphatic hydrocarbon radical having 1 to 6 C atoms or a phenyl radical optionally substituted by methyl groups; and
M is hydrogen, a mono- or divalent metal cation, ammonium or an organic amine radical; and
a is ½ or 1;
b) 6 to 59.89 mol % of structural groups of the formula (II)

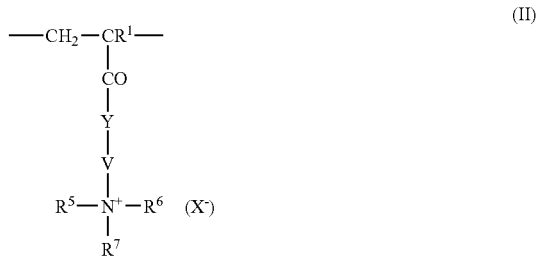

(II)

wherein
Y is O, NH or NR$^5$,
V is —(CH$_2$)$_x$—,

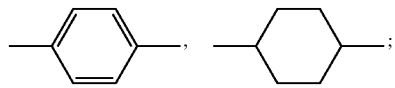

R$^5$ and R$^6$ are independently an aliphatic hydrocarbon radical having 1 to 20 C atoms, a cycloaliphatic hydrocarbon radical having 5 to 8 C atoms or an aryl radical having 6 to 14 C atoms, where the radicals can optionally be substituted by hydroxyl, carboxyl or sulfonic acid groups, $R^7$ is $R^5$ or $R^6$, —$(CH_2)_x$—$SO_3M_a$,

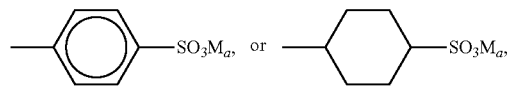

x is from 1 to 6,

X is F, Cl, Br, I, $C_1$- to $C_4$-alkylsulfate or $C_1$- to $C_4$-alkylsulfonate and $R^1$, M and a are as defined above; and at least one of c) and d), wherein c) is from 0.1 to 10 mol % of structural groups of the formula (III)

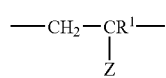 (III)

wherein

Z is —$(CH_2)_q$—$O(C_nH_{2n}O)_p$—$R^8$, or —$COO(C_nH_{2n}O)_p$—$R^8$ n is from 2 to 4;

p is from 1 to 200;

q is from 0 to 20;

$R^8$ is H or a $C_1$- to $C_4$-alkyl radical; and $R^1$ is as defined above;

and d) is from 0.01 to 0.5 mol % of structural groups of the formula (IV)

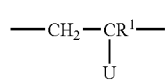 (IV)

wherein

U is —$COO(C_nH_{2n}O)_p$—$R^9$, or —$(CH_2)_q$—$O(C_nH_{2n}O)_p$—$R^9$ $R^9$ is

and an unsaturated or saturated, linear or branched aliphatic alkyl radical having 10 to 30 C atoms, $R^{10}$ is H, a $C_1$- to $C_6$-alkyl or arylalkyl group having a $C_1$- to $C_{12}$-alkyl and $C_6$- to $C_{14}$-aryl radical;

y is 1 to 3; and $R^1$, n, p and q are as defined above wherein up to 5 mol % of the structural groups b) are replaced by further cationic structural units which are derived from N,N-dimethyldiallylammonium chloride and N,N-diethyldiallylammonium chloride.

9. A process for the preparation of a copolymer wherein the copolymer is a water-soluble sulfo group-containing copolymer consisting of a) 40 to 93.89 mol % of structural groups of the formula (I)

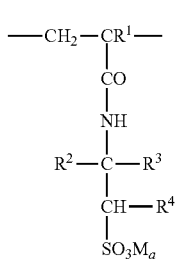 (I)

wherein:

$R^1$ is hydrogen or methyl;

$R^2$, $R^3$, $R^4$ are hydrogen, an aliphatic hydrocarbon radical having 1 to 6 C atoms or a phenyl radical optionally substituted by methyl groups; and M is hydrogen, a mono- or divalent metal cation, ammonium or an organic amine radical; and a is ½ or 1;

b) 6 to 59.89 mol % of structural groups of the formula (II)

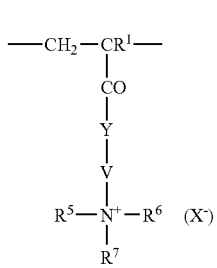 (II)

wherein

Y is O, NH or $NR^5$,

V is —$(CH_2)_x$—,

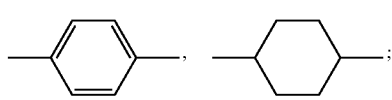

$R^5$ and $R^6$ are independently an aliphatic hydrocarbon radical having 1 to 20 C atoms, a cycloaliphatic hydrocarbon radical having 5 to 8 C atoms or an aryl radical having 6 to 14 C atoms, where the radicals can optionally be substituted by hydroxyl, carboxyl or sulfonic acid groups, $R^7$ is $R^5$ or $R^6$, —$(CH_2)_x$—$SO_3M_a$,

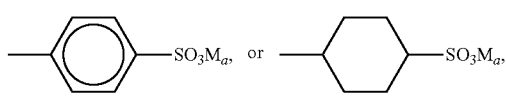

x is from 1 to 6,
X is F, Cl, Br, I, $C_1$- to $C_4$-alkylsulfate or $C_1$- to $C_4$-alkylsulfonate and
$R^1$, M and a are as defined above; and
at least one of c) and d), wherein
c) is from 0.1 to 10 mol % of structural groups of the formula (III)

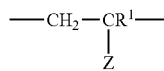
(III)

wherein
Z is —$(CH_2)_q$—$O(C_nH_{2n}O)_p$—$R^8$, or —$COO(C_nH_{2n}O)_p$—$R^8$
n is from 2 to 4;
p is from 1 to 200;
q is from 0 to 20;
$R^8$ is H or a $C_1$- to $C_4$-alkyl radical; and
$R^1$ is as defined above;
and
d) is from 0.01 to 0.5 mol % of structural groups of the formula (IV)

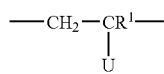
(IV)

wherein
U is —$COO(C_nH_{2n}O)_p$—$R^9$, or —$(CH_2)_q$—$O(C_nH_{2n}O)_p$—$R^9$

$R^9$ is and an unsaturated or saturated, linear or branched aliphatic alkyl radical having 10 to 30 C atoms,
$R^{10}$ is H, a $C_1$- to $C_6$-alkyl or arylalkyl group having a $C_1$- to $C_{12}$-alkyl and $C_6$- to $C_{14}$-aryl radical;
y is 1 to 3; and
$R^1$, n, p and q are as defined above wherein the monomers forming said structures a), b), c) and d) are reacted by free-radical, ionic or complex coordinative bulk, solution, gel, emulsion, dispersion or suspension polymerization.

10. The process as claimed in claim 9, wherein the copolymers are prepared by gel polymerization or solvent polymerization in aqueous phase in the presence of an initiator.

11. The process as claimed in claim 10, wherein the gel, polymerization is carried out at a temperature of from –5 to 50° C. and a concentration of the aqueous solution of 35 to 65% by weight.

12. The process as claimed in claim 11, wherein the solution polymerization is carried out at 10 to 100° C. and a concentration of the aqueous solution of 5 to 30% by weight.

13. An aqueous building material system comprising a hydraulic binder and the copolymer of claim 1.

14. The aqueous building material system of claim 13, wherein the copolymers is present in an amount sufficient to be at least one of a stabilizer, a rheology modifier or a water retention agent.

15. The aqueous building material system of claim 13, wherein the copolymers are employed in an amount from 0.005 to 3% by weight, based on a dry weight of the building material.

16. A composition of matter comprising a paint and the copolymer of claim 1.

17. A composition of matter comprising a coating material and the copolymer of claim 1.

18. The aqueous building material system of claim 13, wherein said hydraulic binder comprises at least one of cement, line, gypsum or anhydrite.

19. A process for the preparation of a copolymer as claimed in claim 7, wherein the monomers forming the structures a), b), c), d) and f) are reacted by free-radical, ionic or complex coordinative bulk, solution, gel, emulsion, dispersion or suspension polymerization.

20. A water-soluble sulfo group-containing copolymer consisting of
a) 40 to 93.89 mol % of structural groups of the formula (I)

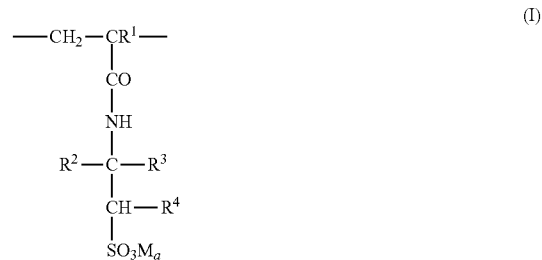
(I)

wherein:
$R^1$ is hydrogen or methyl:
$R^2$, $R^3$, $R^4$ are hydrogen, an aliphatic hydrocarbon radical having 1 to 6 C atoms or a phenyl radical optionally substituted by methyl groups; and
M is hydrogen, a mono- or divalent metal cation, ammonium or an organic amine radical; and
a is ½ or 1;
b) 6 to 59.89 mol % of structural groups of the formula (II)

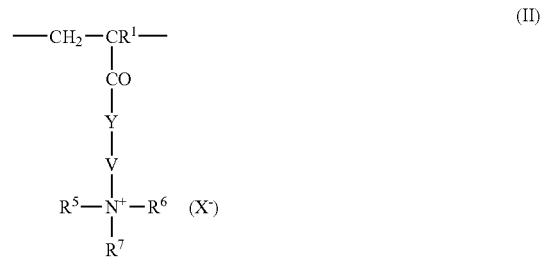
(II)

wherein
Y is O, NH or $NR^5$,
V is —$(CH_2)_x$—,

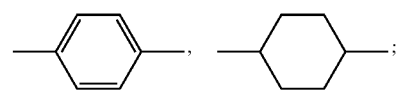

$R^5$ and $R^6$ are independently an aliphatic hydrocarbon radical having 1 to 20 C atoms, a cycloaliphatic hydrocarbon radical having 5 to 8 C atoms or an aryl radical having 6 to 14 C atoms, where the radicals can optionally be substituted by hydroxyl, carboxyl or sulfonic acid groups, $R^7$ is $R^5$ or $R^6$, —$(CH_2)_x$—$SO_3M_a$,

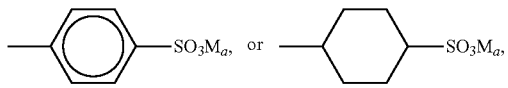

x is from 1 to 6,

X is F, Cl, Br, I, $C_1$- to $C_4$-alkylsulfate or $C_1$- to $C_4$-alkylsulfonate and $R^1$, M and a are as defined above; and at least one of c) and d), wherein c) is from 0.1 to 10 mol % of structural groups of the formula (III)

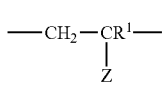

(III)

wherein

Z is —$(CH_2)_q$—$O(C_nH_{2n}O)_p$—$R^8$, or —$COO(C_nH_{2n}O)_p$—$R^{8l}$ n is from 2 to 4;

p is from 1 to 200;

q is from 0 to 20;

$R^8$ is H or a $C_1$- to $C_4$-alkyl radical; and $R^1$ is as defined above;

and d) is from 0.01 to 0.5 mol % of structural groups of the formula (IV)

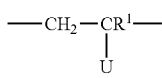

(IV)

wherein

U is —$COO(C_nH_{2n}O)_p$—$R^9$, or —$(CH_2)_q$—$O(C_nH_{2n}O)_p$—$R^9$ $R^9$ is

and unsaturated or saturated, linear or branched aliphatic alkyl radical having 10 to 30 C atoms, $R^{10}$ is a $C_1$- to $C_6$-alkyl or arylalkyl group having a $C_1$- to $C_{12}$-alkyl and $C_6$- to $C_{14}$-aryl radical;

y is 1 to 3; and $R^1$, n, p and q are as defined above, and up to 0.1 mol %, based on the sums of the structural groups a), b), c) and d), of a crosslinker component selected from the group consisting of triallylamine, triallylmethylammonium chloride, tetraallylammonium chloride, N,N'-methylenebisacrylamide, triethylene glycol bismethacrylate, triethylene glycol bisacrylate, polyethylene glycol(400) bismethacrylate and polyethylene glycol(400) bisacrylate.

21. An aqueous building material system comprising a hydraulic binder and the copolymer of claim 6.

22. The aqueous building material system of claim 21, wherein the copolymers is present in an amount sufficient to be at least one of a stabilizer, a rheology modifier or a water retention agent.

23. The aqueous building material system of claim 21, wherein the copolymers are employed in an amount from 0.005 to 3% by weight, based on a dry weight of the building material.

24. A composition of matter comprising a paint and the copolymer claim 6.

25. A composition of matter comprising a coating material and the copolymer of claim 6.

26. The aqueous building material system of claim 21, wherein said hydraulic binder comprises at least one of cement, line, gypsum or anhydrite.

27. An aqueous building material system comprising a hydraulic binder and the copolymer of claim 7.

28. The aqueous building material system of claim 27, wherein the copolymers is present in an amount sufficient to be at least one of a stabilizer, a rheology modifier or a water retention agent.

29. The aqueous building material system of claim 27, wherein the copolymers are employed in an amount from 0.005 to 3% by weight, based on a dry weight of the building material.

30. A composition of matter comprising a paint and the copolymer of claim 7.

31. A composition of matter comprising a coating material and the copolymer of claim 7.

32. The aqueous building material system of claim 27, wherein said hydraulic binder comprises at least one of cement, line, gypsum or anhydrite.

33. An aqueous building material system comprising a hydraulic binder and the copolymer of claim 8.

34. The aqueous building material system of claim 33, wherein the copolymers is present in an amount sufficient to be at least one of a stabilizer, a rheology modifier or a water retention agent.

35. The aqueous building material system of claim 33, wherein the copolymers are employed in an amount from 0.005 to 3% by weight, based on a dry weight of the building material.

36. A composition of matter comprising a paint and the copolymer of claim 8.

37. A composition of matter comprising a coating material and the copolymer of claim 8.

38. The aqueous building material system of claim 33, wherein said hydraulic binder comprises at least one of cement, line, gypsum or anhydrite.

* * * * *